(12) United States Patent
Neill

(10) Patent No.: US 9,027,072 B2
(45) Date of Patent: May 5, 2015

(54) DYNAMIC APPLICATION LOADER FOR SET TOP BOX

(75) Inventor: Richard Neill, Syosset, NY (US)

(73) Assignee: CSC Holdings, LLC, Bethpage, NY (US)

( * ) Notice: Subject to any disclaimer, the term of this patent is extended or adjusted under 35 U.S.C. 154(b) by 273 days.

(21) Appl. No.: 13/612,441

(22) Filed: Sep. 12, 2012

(65) Prior Publication Data

US 2013/0007211 A1    Jan. 3, 2013

Related U.S. Application Data

(62) Division of application No. 12/684,006, filed on Jan. 7, 2010, now Pat. No. 8,528,037.

(60) Provisional application No. 61/238,058, filed on Aug. 28, 2009.

(51) Int. Cl.
| | | |
|---|---|---|
| *H04N 7/173* | (2011.01) | |
| *H04N 21/443* | (2011.01) | |
| *H04N 21/6543* | (2011.01) | |
| *H04N 21/6547* | (2011.01) | |
| *H04N 21/81* | (2011.01) | |

(52) U.S. Cl.
CPC ......... *H04N 21/443* (2013.01); *H04N 21/6543* (2013.01); *H04N 21/6547* (2013.01); *H04N 21/8166* (2013.01)

(58) Field of Classification Search
CPC ............ H04N 21/435; H04N 21/8166; H04N 7/17318; H04N 21/443; H04N 21/6543; H04N 21/6547
See application file for complete search history.

(56) References Cited

U.S. PATENT DOCUMENTS

| | | |
|---|---|---|
| 6,029,196 A | 2/2000 | Lenz |
| 6,205,476 B1 | 3/2001 | Hayes, Jr. |
| 6,237,092 B1 | 5/2001 | Hayes, Jr. |
| 6,557,031 B1 | 4/2003 | Mimura et al. |
| 6,718,374 B1 | 4/2004 | Del Sordo et al. |
| 6,976,062 B1 | 12/2005 | Denby et al. |
| 7,085,287 B1 | 8/2006 | Chapman |
| 7,630,325 B1 | 12/2009 | Bajpay et al. |
| 8,255,893 B2 | 8/2012 | Savva |
| 8,528,037 B2 | 9/2013 | Neill |

(Continued)

FOREIGN PATENT DOCUMENTS

| | | |
|---|---|---|
| WO | WO 2006/127706 A2 | 11/2006 |
| WO | WO 2008/123858 A1 | 10/2008 |

OTHER PUBLICATIONS

Non-Final Rejection mailed Jun. 2, 2014 for U.S. Appl. No. 13/612,446, filed Sep. 12, 2012; 13 pages.

*Primary Examiner* — Rong Le

(74) *Attorney, Agent, or Firm* — Sterne, Kessler, Goldstein & Fox, PLLC

(57) ABSTRACT

Set top boxes (STBs) in a cable system are configured on a box-by-box basis to facilitate beta and trial testing of new or updated services. STBs are assigned to deployment groups identified by a deployment group identifier. Features configurations including hierarchies of features can be defined individually for different deployment groups. Configuration files for provisioning the STBs are provided by a cable system head end according to the deployment group the STB is assigned to. STBs can be configured at the time they boot and register with the system or in a "hot" manner to avoid rebooting.

20 Claims, 12 Drawing Sheets

(56) References Cited

U.S. PATENT DOCUMENTS

| | | |
|---|---|---|
| 2002/0012347 A1 | 1/2002 | Fitzpatrick |
| 2002/0124243 A1* | 9/2002 | Broeksteeg et al. .......... 717/168 |
| 2002/0129095 A1* | 9/2002 | Hatalkar ....................... 709/203 |
| 2004/0003266 A1 | 1/2004 | Moshir et al. |
| 2005/0108757 A1 | 5/2005 | Lee et al. |
| 2005/0120377 A1 | 6/2005 | Carlucci et al. |
| 2005/0132348 A1 | 6/2005 | Meulemans et al. |
| 2005/0132349 A1 | 6/2005 | Roberts et al. |
| 2005/0132359 A1 | 6/2005 | McGuire et al. |
| 2005/0144651 A1 | 6/2005 | Prus et al. |
| 2005/0154680 A1 | 7/2005 | Schmelzer |
| 2005/0210459 A1 | 9/2005 | Henderson et al. |
| 2006/0143289 A1 | 6/2006 | Smith et al. |
| 2006/0218612 A1 | 9/2006 | Johnson et al. |
| 2006/0225107 A1 | 10/2006 | Seetharaman et al. |
| 2007/0291777 A1 | 12/2007 | Jamieson et al. |
| 2008/0141018 A1* | 6/2008 | Tanaka et al. ..................... 713/2 |
| 2008/0282299 A1 | 11/2008 | Koat et al. |
| 2009/0210921 A1* | 8/2009 | Ramsdell ....................... 725/120 |
| 2010/0023350 A1 | 1/2010 | Simms |
| 2010/0131633 A1 | 5/2010 | Herlein et al. |
| 2011/0055889 A1 | 3/2011 | Neill |
| 2013/0007832 A1 | 1/2013 | Neill |

* cited by examiner

| Group | UI Version | Location |
|---|---|---|
| 0 | 9.0 | bfs1://xxx/cv_mgr.ptv |
| 1 | R12 | bfs2://yyy/cv_mgr.ptv |
| 2 | 9.5 | bfs1://zzz/cv_mgr.ptv |

Figure 7a

```
                                                              ─ 710
    versions.cfg
    dncsip;uiver;fdate;ftime;frange;dgroup;forcedg;execpath;params;
    10.251.213.1;8.5.7;05/05/2009;1230;10;-1;;;;
    10.251.209.65;0.86.8;04/27/2009;1430;10;-1;;;;
    10.251.209.65;0.86.201;06/22/2009;1430;10;2;1;;;
    10.251.209.65;0.86.201;06/22/2009;1430;10;4;0;;bfs:///UI_APP-
    OOB/cv_mgr_ebif.cfg;
    10.251.209.65;0.86.201;06/22/2009;1430;10;5;0;;bfs:///UI_APP-
    OOB/cv_mgr_dob2.cfg;
```

712 — versions.cfg
714 — dncsip;uiver;...
716, 718, 720, 722, 724 — configuration lines

Figure 7b

```
featuredesc;dgroup;deps;startpw;endpw;uiversion;params;precondition;
shortcuts_0_0;1;;1240200000;1271736000;8.6.1;;;
Documentation Feature Set_0_0;.99;;1244347200;1370577600;8.5.7;;;
Feature43_1_0;100;feature30_1_1;1257048000;1258002000;8.5, 8.6;;;
test1_1_0;236;test10_1_0;1243915200;1306987200;0.86.10;;;
test2_1_0;236;test10_1_0;1243915200;1306987200;0.86.10;;;
test3_1_0;236;test9_1_0,test10_1_0;1243915200;1306987200;0.86.10;;;
test5_1_0;236;test9_1_0;1243915200;1306987200;0.86.10;;;
test6_1_0;236;test9_1_0;1243915200;1306987200;0.86.10;;;
test7_1_0;236;;1243915200;1306987200;0.86.10;;;
test9_1_0;236;;1243915200;1306987200Q.86.10;;;
test10_1_0;236;;1243915200;1306987200;0.86.10;;;
test4_1_0;238;;1241496000;1304568000;0.86.10;;;
test8_1_0;238;;1241496000;1304568000;0.86.10;;;
r12_pods_topPicks_1_0;250;;1236142800;1325307600;0.86.5;;;
r12_pods_search_1_0;250;;1236142800;13250B7600;0.86.5;;;
r12_pods_onDemand_1_0;250;;1236142800;1325307600;0.86.5;;;
r12_pods_optimumClick_1_0;250;;1236142800;1325307600;0.86.5;;;
r12_pods_weather_1_0;250;;1236142800;1325307600;0.86.5;;;
```

Figure 8

DYNAMIC APPLICATION LOADER FOR SET TOP BOX

CROSS-REFERENCE TO RELATED APPLICATIONS

This application is a Divisional of U.S. application Ser. No. 12/684,006, filed Jan. 7, 2010, now U.S. Pat. No. 8,528,037, which claims benefit to U.S. Provisional Patent Application No. 61/238,058, filed Aug. 28, 2009, now expired, all of which are incorporated by reference herein in their entirety.

FIELD OF THE INVENTION

Embodiments of the present invention relate to provisioning set top boxes. More specifically, embodiments of the present invention relate to dynamically loading or updating applications and data to set top boxes.

BACKGROUND OF THE INVENTION

Modern cable service providers provide myriad services to their subscribers. These services include television, high-speed internet, telephony, FM radio, and other services. Typically, these services are provided using a set top box (STB) located in the subscriber's home. The STB tunes, filters, and demodulates television and other signals transmitted from the cable provider.

Subscribers interact with the STB to access the services they subscribe to. Generally, this access is provided though a run-time environment or user interface (UI). Typically, a UI comprises a collection of binary files controlled by an operating system. A user interface (UI) is a bundle of application software that makes up a user interface. An exemplary UI is the "iO R4 User Interface" used by Cablevision Systems Corp. of Bethpage, N.Y.

Oftentimes, a cable provider would like to perform a test of a portion of the cable communication system or conduct a trial for new software or features. In such cases, the cable provider would prefer to provision a selected group of STBs for the test or trial. Further, there are times when a cable provider may wish to perform a "phased" roll out of new software or features. For example, when new software, such as a new user interface (UI) version, is released, a cable provider may wish to update groups of STBs with the new UI over time to provide time for receipt and evaluation of subscriber feedback and identification and resolution of bugs in the test or trial system. Such selected provisioning or phased rollout minimizes the impact on the system by limiting the number of subscribers exposed to the test or trial.

However, in conventional cable communication systems, cable providers generally provision set top boxes (STBs) in an "all-or-nothing" manner. That is, all STBs in the subscriber base have the same base software and provide the same base UI on a system by system basis. As a result, targeting a particular group of STBs with particular software or in such manner as to limit exposure to test or trial software is difficult. Put another way, it is difficult to direct a first set of software or features to a first group of set top boxes, a second set of software or features to a second group of STBs, a third set of software or features to a third group of STBs, and so on. As a result, testing new software or feature offerings or conducting trials using a selected group of STBs can be difficult or impossible in a conventional cable communication system.

Instead, to provision STBs in convention cable communication systems, typically, a single application software image is distributed, or flags are hardcoded into software associated with a particular software package or feature set. The flags affect the state of the STB when the STB is rebooted. In one state, a flag allows the STB to activate software associated with a particular service. In another state, the flag does not permit the STB to activate software associated with a particular service. In this manner, STBs can be provisioned to allow selected services or feature sets.

However, as described above, in conventional systems the flags are applied in a global manner for all STBs in the system, not on a per STB basis. This is because the flags are set in the new software provided from a head end that controls STB provisioning in the system. Because the head end provides the same software to all of the STBs in the system, all STBs in the system are provisioned with the same features sets. As a result, in conventional cable systems, testing and trials can be performed only on a global or very limited system by system basis.

A further problem with conventional cable provisioning systems is that STBs must be rebooted to update new software when the STB receives the software. Downtime during reboot is inconvenient to subscribers. Because subscribers rarely anticipate such downtime, cable provider call centers are often impacted due to increased subscriber calls. As a result, such updating is done as infrequently as possible. Counterbalancing this desire to limit service disruption due to STB rebooting is the desire to provide new products and services as quickly as possible. A cable provider cannot provide services as quickly as possible if they are hampered by having to consider issues associated with STB reboot prior to providing those services.

BRIEF SUMMARY OF THE INVENTION

Embodiments allow set top boxes (STBs) in a cable system to be provisioned on a granular box-by-box basis to facilitate beta and trial testing of new or updated software or features. STBs are assigned to deployment groups identified by a deployment group identifier. Different software configurations including hierarchies of software configurations can be defined individually for different deployment groups. In an embodiment, each deployment group is associated with different software or feature sets. In another embodiment, the same software or feature sets are assigned to more than one deployment group. Configuration files for provisioning the STBs are provided by a cable system head end according to their assigned deployment groups. STBs can be provisioned at the time they boot and register with the system or in a "hot" manner to avoid rebooting.

One embodiment is a method for provisioning an STB in a cable system. The method includes determining a deployment group identifier and downloading a boot configuration file corresponding to the deployment group identifier. Using the boot configuration file, a process manager file is identified. The identified process manager file is downloaded and executed. A services configuration file is downloaded and a user interface launched in accordance with the downloaded services configuration file. In an embodiment, the services configuration file includes dependency information that defines a hierarchy of services presented by the STB to a user in a UI.

Another embodiment is a system for provisioning a set top box in a cable system. The system includes a network control system that has a communication link to at least one set top box. In an embodiment, the communication link provides a link to the at least one set top box to provide command/control and data. The system also includes a publication system on which configuration files to be used by applications executing on the at least one set top box are created. The created configuration files are stored in a storage system. Further, the system is configured to respond to a request from a requesting set top box by sending a configuration file to the requesting set top box in accordance with a deployment group identifier included in the request.

Another embodiment is a set top box having a port to input a cable signal and a video processor to process the cable signal and extract therefrom encapsulated data. The set top box further includes a CPU to execute an application to download from a head end of the cable system a configuration file to provision the set top box in accordance with a deployment group identifier. In an embodiment, the deployment group identifier is stored in a non-volatile RAM. The deployment group identifier can be stored in the non-volatile RAM by a cable provider or sent to the set top box by the cable provider. Once received, the deployment group identifier can be used to provision the set top box and/or stored in the non-volatile RAM.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 7a illustrates an exemplary boot configuration file according to an embodiment of the present invention.

FIG. 7b illustrates an exemplary boot configuration file according to another embodiment of the present invention.

FIG. 8 illustrates an exemplary services configuration file according to an embodiment of the present invention.

The present invention is described with reference to the accompanying drawings. The drawing in which an element first appears is typically indicated by the leftmost digit in the corresponding reference number.

DETAILED DESCRIPTION OF THE INVENTION

Figure 1A:
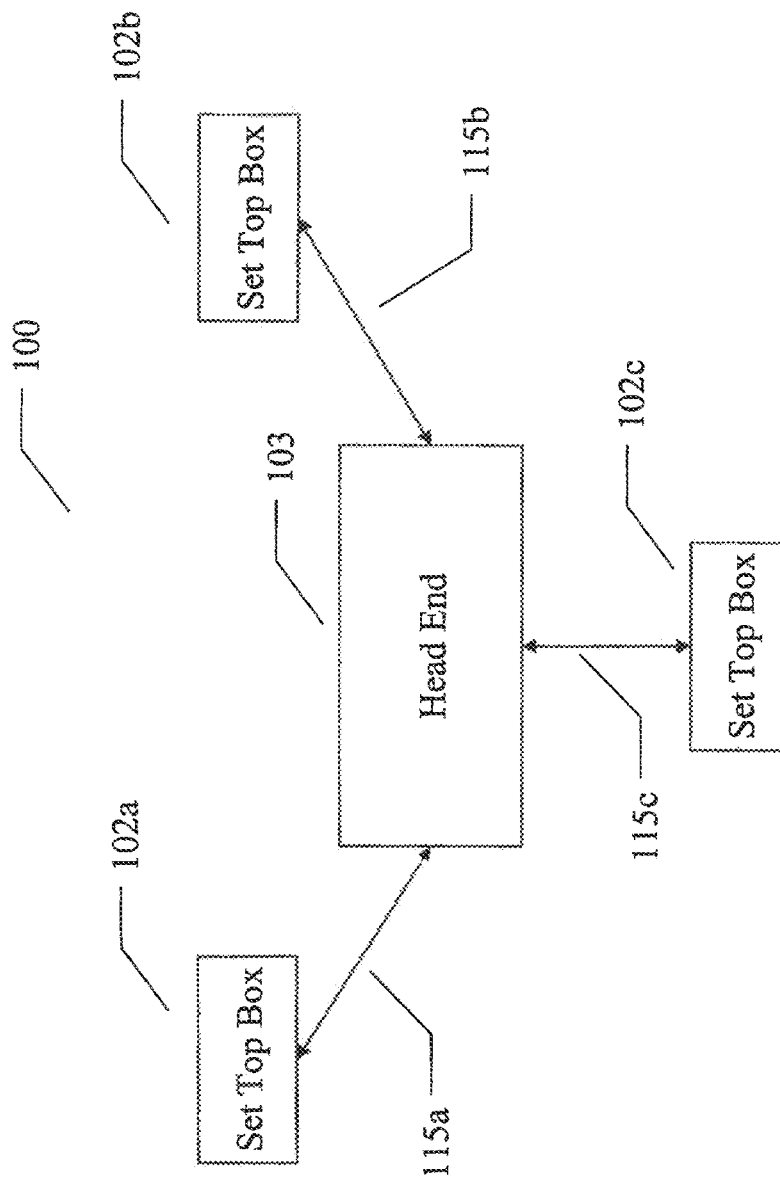
FIG. 1a is a schematic diagram of a cable system according to an embodiment of the present invention.

FIG. 1a is a schematic diagram of a cable system 100 according to an embodiment of the present invention. As shown in FIG. 1a, set top boxes (STBs) 102a, 102b, and 102c are coupled to a head end 103 through communication links 115a, 115b, and 115c respectively. Each STB 102a, 102b, and 102c is configured as described below to obtain software and data from head end 103 according to an embodiment of the present invention.

Exemplary STBs 102a, 102b, and 102c include, without limitation, the Explorer™ 8300HDC DVR Series, Explorer™ 4200, and Explorer™ 1850 available from Cisco® of San Jose, Calif. available from Cisco® of San Jose, Calif. Embodiments are not limited to these exemplary STBs, and it would be apparent to those skilled in the art that other STBs can be used in embodiments described herein.

Figure 1B:
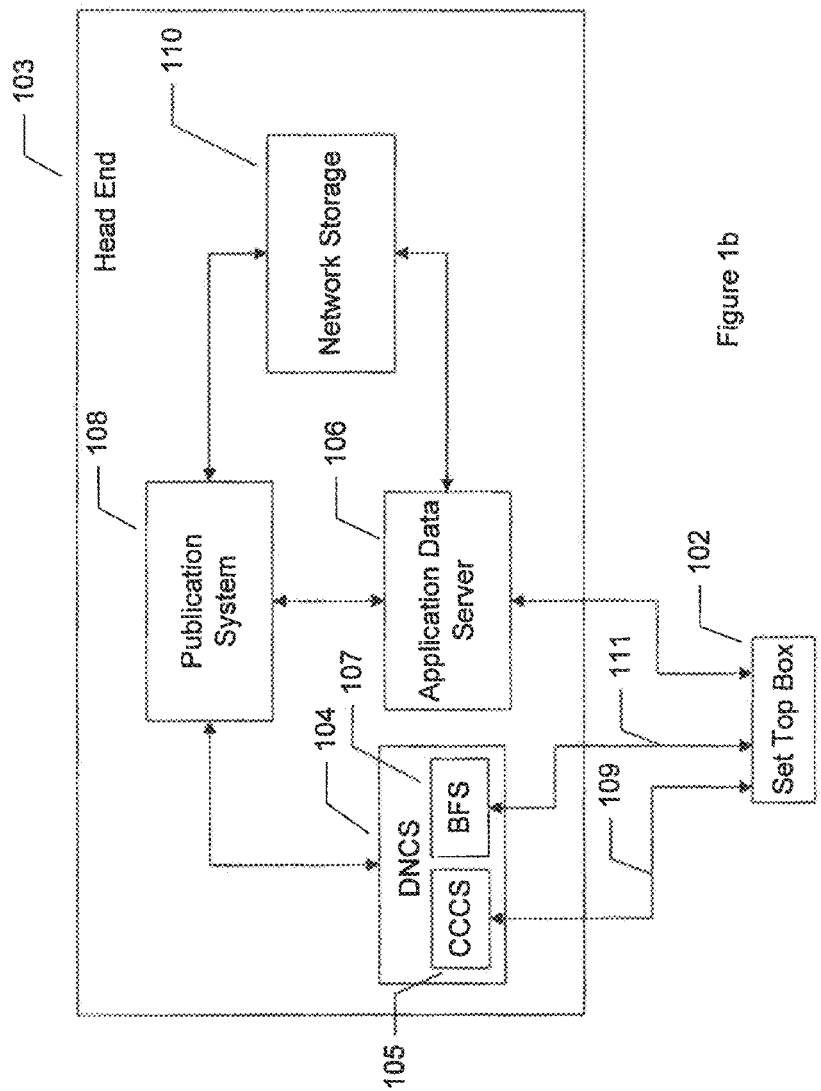
FIG. 1b is a schematic diagram of a head end according to an embodiment of the present invention.

FIG. 1b is a schematic diagram of a head end 103 according to an embodiment of the present invention. STB 102 obtains initialization and configuration information from a digital set-top network control system (Cisco® DNCS) 104. For example, STB 102 obtains software and data required for initialization, bootstrapping, and applications from DNCS 104. In an embodiment, the software includes command/control, UIs, and applications, and the data includes configuration files for accessing the UIs, applications, and other data to be used by applications executing on an STB.

DNCS server 104 includes two subcomponents: (1) Command, control and configuration system (CCCS) 105 and (2) broadcast file system (BFS) 107. CCCS 105 communicates with STB 102 over a communication link 109 to provide software and data to STB 102. In an embodiment, the software includes applications, such as command/control and UIs, in the form of executable files to be executed on STB 102 and the data includes data, such as configuration files, to be used by applications executing on STB 102. In an embodiment, communication link 109 provides an out-of-band TCP/IP over DAVIC link. In an embodiment, CCCS 105 is optional.

BFS 107 communicates with STB 102 over a communication link 111. over which to provide software and data to STB 102. In an embodiment, the software includes applications, such as command/control and UIs, in the form of executable files to be executed on STB 102 and the data includes data, such as configuration files, to be used by applications executing on STB 102. In an embodiment, communication link 111 provides an in-band delivery system to deliver software and data to STB 102 over the video (MPEG) transport. For transporting software and/or data over the video transport MPEG channel, in an embodiment, the software and/or data is encapsulated into an MPEG frame and sent at a particular transport frequency.

An application data server (ADS) 106 provides a second way of delivering the software and data to STB 102. In an embodiment, ADS 106 is implemented as an HTTP server that applications executing on STB 102 can access over communication link 113. using for example, TCP/IP For example, in an embodiment, applications executing on STB 102 can access software and/or data on ADS 106 using an HTTP "GET" request to pull in files, programs or other data they may require. In an embodiment, ADS 106 functions as an asynchronous message delivery server in addition to its is not only data delivery server function. For example, in an embodiment, ADS 106 can send files, programs or other data to applications executing on STB 102 using an HTTP "PUSH" request. Consequently, ADS 110 can deliver applications and data for applications using TCP/IP. In addition, ADS 110 can send a UNICAST message to STB 102 to send applications and data to STB 102 or to dynamically re-provision STB 102.

An application publication system (APS) 108 provides a platform for creating configuration files for configuring STB 102 and for use by applications executing on STB 102. The created files are stored on a network storage 110. The configuration files are published by APS 108 to CCCS 105, BFS 107 and/or ADS 106 to be distributed to the STB 102 as required. In an embodiment, APS 108 reads relevant data from network storage 110 and publishes them to ADS 106 and/or BFS 107.

Figure 2:
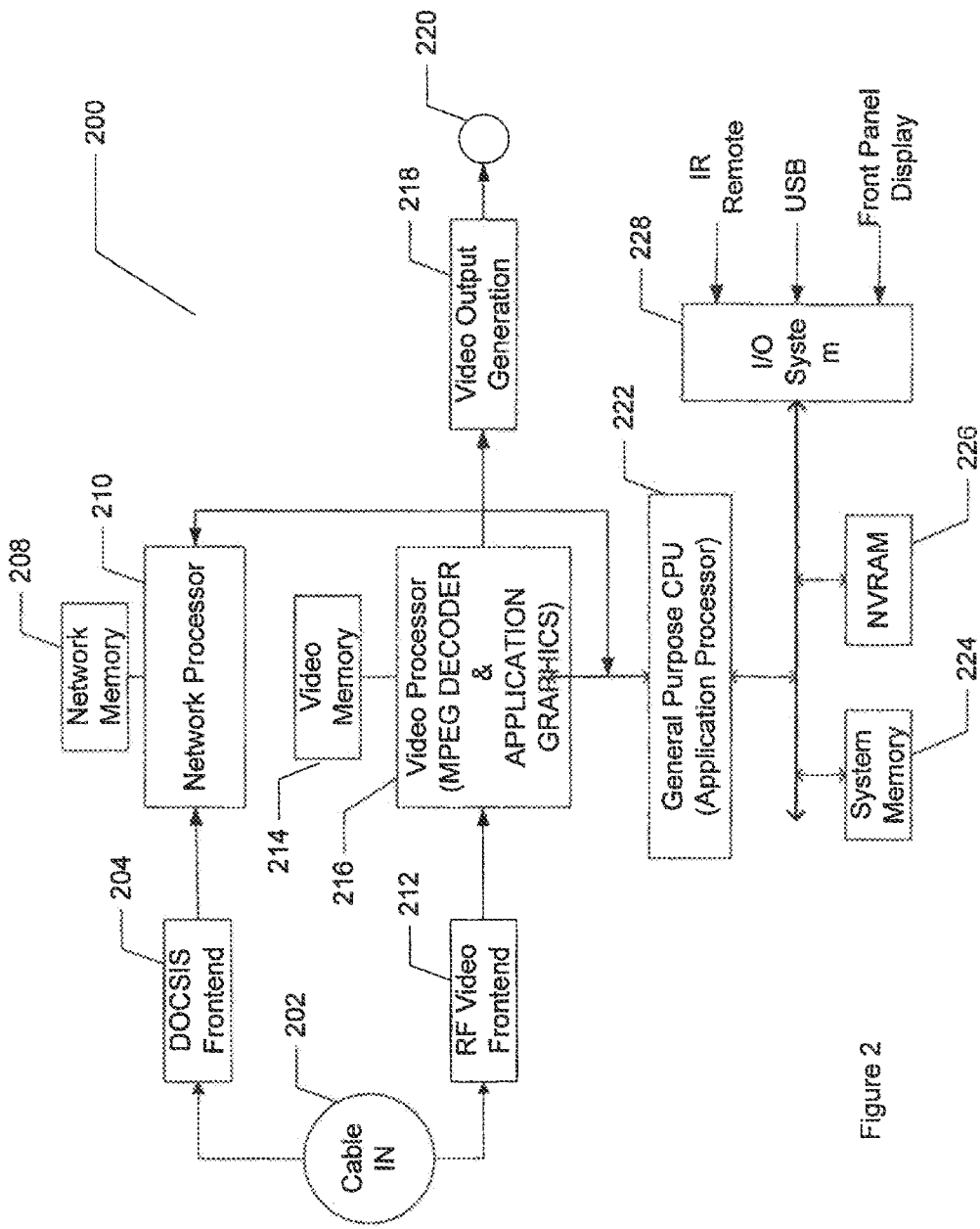
FIG. 2 is a schematic diagram of a set top box according to an embodiment of the present invention.

FIG. 2 is a schematic diagram of an exemplary set top box (STB) 200 according to an embodiment of the present invention. STB 200 includes a cable port 202 for attaching a cable over which a cable signal is received from the cable service provider. The cable signal is provided to a Data Over Cable Service Interface Specification (DOCSIS) front end 204. DOCSIS front end 204 conditions the input cable signal to extract software and data contained therein and provides software and data to a network processor 210. The software and data extracted by DOCSIS front end 204 can include, but is not limited to, program guide data, channel listing data, and software updates, such as new user interface (UI) software, and feature set configuration updates.

Network processor 210 uses the extracted software and data and, in conjunction with a general purpose CPU 222, configures the set top box, as well as provides information to the user when requested. To support its operation, network processor 210 has available to it a network memory 208.

The input cable signal is also provided to an RF front end 212. RF front end 212 conditions the input cable signal to extract the video, sound, and application graphics data from the input cable signal. The extracted video, sound and application graphics data is sent to a video processor 216 for processing. Video processor 216 has available to it a video memory 214 to support its processing function. Processed video, sound, and/or graphics data is provided to a video output generation module 218. Video output generation module 218 generates a video signal to be out through output port 220 to a subscriber television for display.

Video processor 216 also processes software and data that may be encapsulated in MPEG frames received from the head end. The software and data extracted by Video processor 216 can include, but is not limited to, program guide data, channel listing data, and software updates, such as new user interface (UI) software, and feature set configuration updates.

STB 200 further includes a general purpose CPU 222. General purpose CPU 222 is configured to control the operation of STB 222 and in conjunction with Network Processor 210 to provide the functionality described more fully herein. For examples, CPU 222 is used to execute software collected by network processor 210 and/or video processor 216 using data collected by network processor 210 and/or video processor 216.

General purpose CPU 222 is coupled to a system memory nonvolatile ram (NVRAM) 226 and an input/output (I/O) subsystem 226. General purpose CPU 222 uses system memory 224 as support to perform its operations. As described in more detail later, a deployment group ID is stored in NVRAM 226. The deployment group ID is used to determine the software and features available to STB 102. I/O subsystem 228 provides an interface for an infrared remote control, a USB port, and control for a front panel display on STB 200.

Using the system of FIG. 2, STB 102 can send requests to head end 103 to request provisioning based on a deployment group ID. Such a provisioning request may be sent when STB 102 first boots up and registers with the system. Additionally, such requests can be made periodically, such as once a day, once a week, or other scheduled time frame. In addition, head end 103 can send messages to STB 102 to change the provisioning of STB 102. For example, head end 103 can send a message to STB 102 with a new deployment group and instructions for STB 102 to provision itself using the new deployment group ID. For example, in an embodiment, if STB 102 has established an HTTP connection with ADS 106, such that STB 102 has an IP address, ADS 106 can use its notification service to do a real-time push of the message. In another embodiment, if STB 102 has established an HTTP connection with ADS 106 such that STB 102 has an IP address, ADS 106 can use its profile servlet to do a post-boot pull of the message. In another embodiment, if STB 102 does not have an IP address or is in standby mode, a signal file can be sent by RFS 107 to effectuate an update.

According to embodiments of the present invention, software can be provisioned on STBs in cable system 100 on a per-STB basis. As used herein, the terms "provisioning," "provisioned," and "provision" include assigning applications to STBs. This allows granular control of STBs in a cohesive fashion for selected provisioning of software and features. As a result, the issues described above with global software deployment are overcome.

To accomplish granular software deployment, STBs are assigned to "deployment groups." A deployment group is a group of STBs that have a common characteristic. For example, STBs in a deployment group may have a common feature set, a common UI, or some other common characteristic. Deployment groups can be defined in terms of STB serial number, zip code where the STB is located, subscriber area code, STB manufacturer, or any other way of uniquely identifying one or a group of STBs. The fundamental level at which an application or feature can be activated or deactivated according to embodiments of the present invention is at the deployment group level.

In an embodiment, deployment groups are identified by a deployment group identifier or identification (deployment group ID). In an embodiment, for example, the group ID is an integer between 0 and 255 with 0 being defined as the default group.

The deployment group ID can be stored in the non-volatile RAM by a cable provider or sent to the set top box by the cable provider. Once received, the deployment group identifier can be used to provision the set top box and/or stored in the non-volatile RAM. In another embodiment, when an STB reboots and registers with the system, the deployment group ID has an illegal value (e.g., "−1"). The illegal value indicates to the STB that it need to obtain "force deployment group" information to obtain the correct deployment group ID. In an embodiment, the STB obtains the force deployment group information from a boot configuration file and stores it in its non-volatile RAM. Exemplary boot configuration files are described with respect to FIGS. 7a and 7b.

Figure 3:
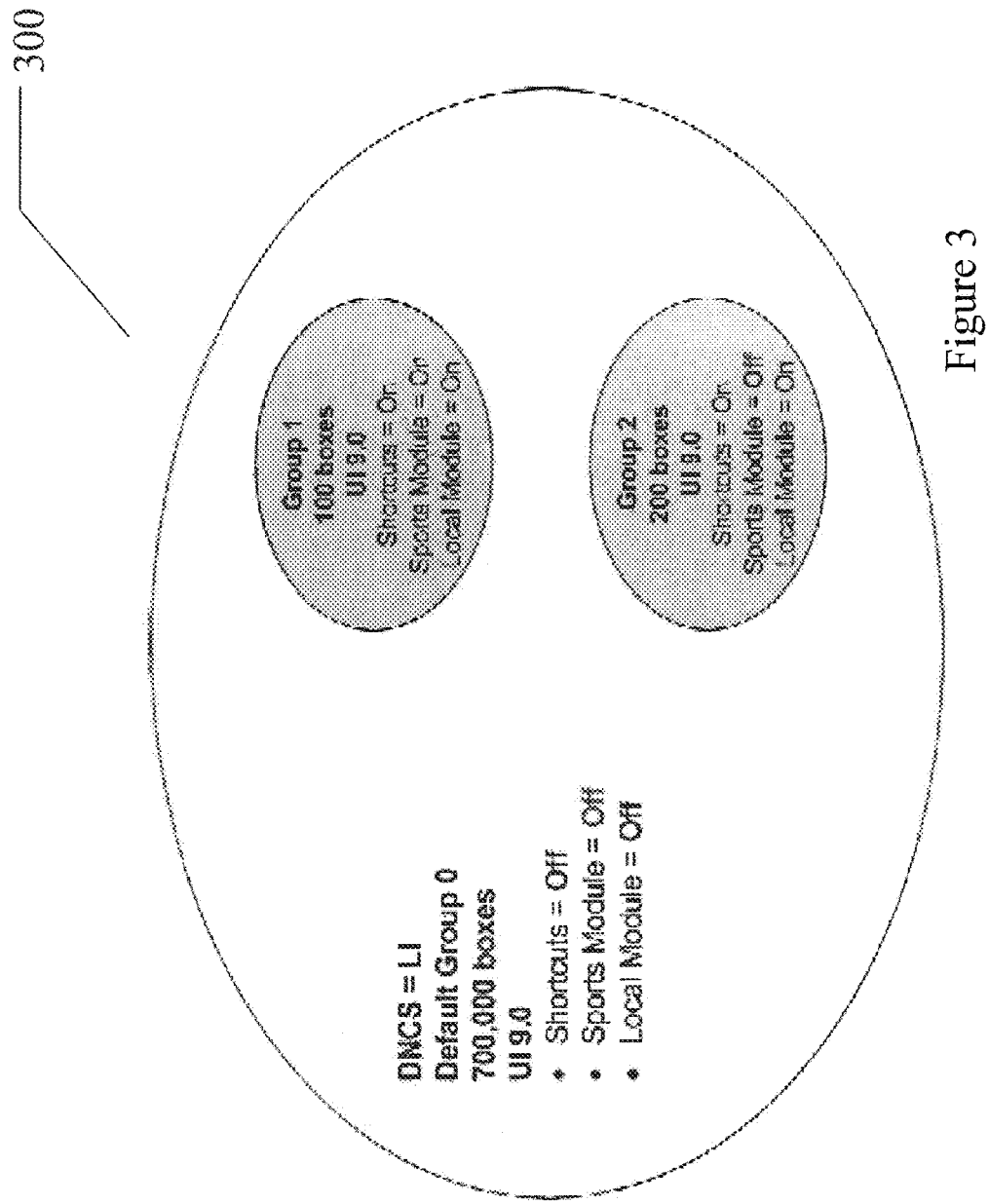
FIG. 3 illustrates an exemplary subscriber base having a deployment group scheme showing flexible feature activation according to an embodiment of the present invention.
Figure 4:
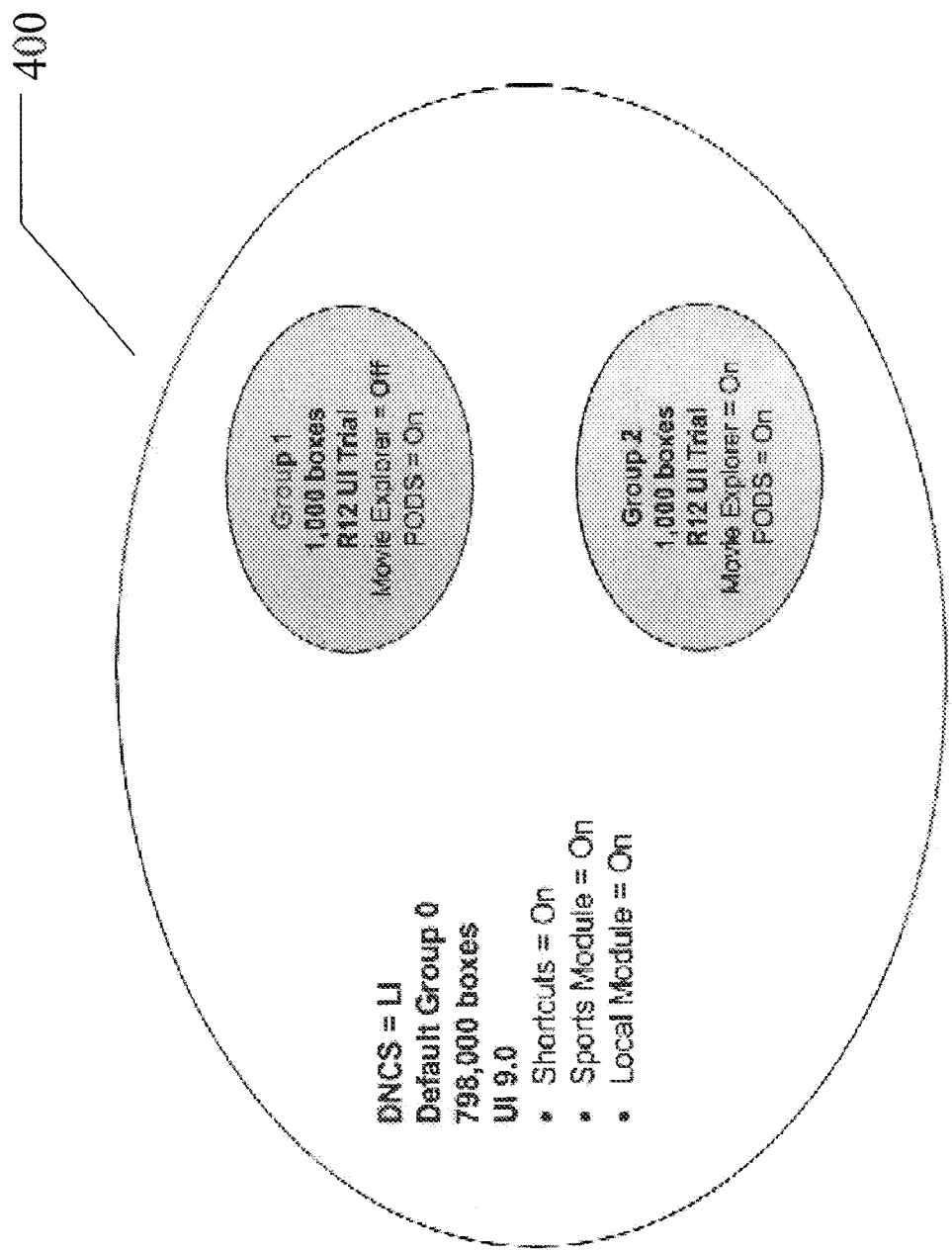
FIG. 4 illustrates an exemplary subscriber base having a deployment group scheme showing heterogeneous UI version implementations according to an embodiment of the present invention.

FIGS. 3 through 5 illustrate several subscriber bases with deployment schemes to illustrate, without limitation, flexibility provided by assigning STBs to deployment groups in accordance with embodiments of the present invention. This flexibility facilitates beta and trial testing for provisioning new services, surveying existing services, and the like.

FIG. 3 illustrates an exemplary subscriber base 300 having a deployment group scheme showing flexible feature activation according to an embodiment of the present invention. As shown in FIG. 3, subscribers are assigned to one of 3 deployment groups. Each deployment groups includes 3 features: Shortcuts, Sports Module, and Local Module. Each of the features can be in an active (ON) or inactive (OFF) state. If a feature is in an active state, an STB can access the feature. If the feature is in an inactive state, the feature is inaccessible by the STB.

In an embodiment, features or feature sets are provided to STBs through software suites located in the head end that are downloaded to the STBs either when the STB reboots and registers with the system or in a "hot" manner through messages sent from the head end to the STB. As described below, the reboot and registration process uses a configuration file associated with deployment group ID to load the STB with the desired software suite. As further described below, flags are provided by the head end during the reboot and registration process to enable or disable services for a particular STB. In this manner, individual or groups of STBs are provisioned.

STBs can also be provisioned in a "hot" manner as well, without requiring reboot. This is accomplished by the head end sending a message to one or more targeted STBs instructing the targeted STBs to acquire a new configuration file. For example, in an embodiment, PS 112 is configured to trigger an event in the ADS to send a UNICAST message to one or more targeted STBs. The message includes a deployment group ID. Once acquired, the deployment group ID replaces the deployment group stored in NVRAM 226. The STB then uses deployment group ID to obtain the correct software suite as described above. In another embodiment, the STB can poll the head end for changes to its configuration. If the head end responds that there is a change, the STB requests the appropriate deployment group ID be sent to it from the head end. Once acquired, the deployment group ID replaces the deployment group stored in NVRAM 226. The STB then uses deployment group ID to obtain the correct software suite as described above. In another embodiment, STB 102 obtains the deployment group ID, but does not replace the deployment group ID stored in NVRAM 226. Once received, STB 200 uses the received deployment group ID to obtain the correct software. Thus, the present invention provides for highly granular provisioning of software and features to one or more groups of one or more STBs. Such provisioning facilitates software and feature testing and trials.

As shown in FIG. 3, 700,000 subscribers are assigned to default deployment group 0. UI version 9.0 is the user interface software implemented on STBs in default deployment group 0. Each of the features Shortcuts, Sports Module, and Local Module are set to inactive. As a result, subscribers in default deployment group 0 do not have access to the features.

One hundred (100) subscribers have been assigned to deployment group 1. Deployment group 1 also uses UI version 9.0. Features Shortcuts, Sports Module, Local Module are all set to active. Consequently, subscribers in deployment group 1 have access to each of these features.

Two hundred (200) subscribers have been assigned to deployment group 2. Deployment group 2 also uses UI version 9.0. Features Shortcuts and Local Module are set to active, while the feature Sports Module is set to inactive. Consequently, subscribers in deployment group 1 have access to the Shortcuts and Local Module features, but not the Sports Module feature.

Allowing such flexible feature provisioning facilitates beta and trial testing. For example, by monitoring usage between deployment groups 1 and 2 and obtaining feedback from subscribers in deployment groups 1 and 2, a cable service provider can make observations concerning the Shortcuts, Sports Module, and Local Module features offered to customers. Further, the flexibility offered by embodiments of the present invention allow a service provider to test different combinations of features based on such criteria as where a STB location, subscriber demographics, and other criteria.

FIG. 4 illustrates an exemplary subscriber base 400 having a deployment group scheme showing heterogeneous UI version implementations according to an embodiment of the present invention. As in FIG. 3, three (3) deployment groups are shown in FIG. 4. The embodiment illustrated in FIG. 4 can be trial tested by a small group of subscribers to determine whether a new UI should be released while the majority of the subscriber base continues to use the standard or baseline UI.

Default deployment group 0 is shown with the standard or baseline UI version 9.0. In addition, default deployment group 0 includes 3 features: Shortcuts, Sports Module, and Local Module. Because all 3 features are set to ON, they are accessible subscribers having STBs assigned to default deployment group 0.

In addition to default deployment group 0, FIG. 4 illustrates two additional deployment groups, deployment group 1 and deployment group 2. Deployment groups 1 and 2 each have 1000 subscribers STBs assigned to them. As shown in FIG. 4, deployment groups 1 and 2 operate using a different UI, that is, R12. R12 may be, for example, a new UI or new UI version a cable provider desires to release. Thus, an embodiment of the present invention allows the cable provider to test the new UI, UI R12, to determine whether it should be rolled out to any of the subscriber base, or to determine if it requires additional development.

As illustrated in FIG. 4, UI R12 includes different features Movie Explorer and PODS. In the illustrated embodiment, features Movie Explorer and PODS are features included in UI R12 in addition to the Shortcuts, Sports Module, and Local Module features. The feature Movie Explorer is set to ON in deployment group 1 and set to OFF in deployment group 2. PODS is set to ON in each of groups 1 and 2. Thus, FIG. 4 also illustrates that new features can be trial tested along with UIs. For example, Movie Explorer can be evaluated by considering feedback from subscribers who used it in deployment group 2.

According to an embodiment, features sets can have dependencies on one another. For example, feature sets may be organized as a hierarchy of feature sets. Feature sets higher in the hierarchy can control the behavior of feature sets lower in the hierarchy.

Figure 5A:
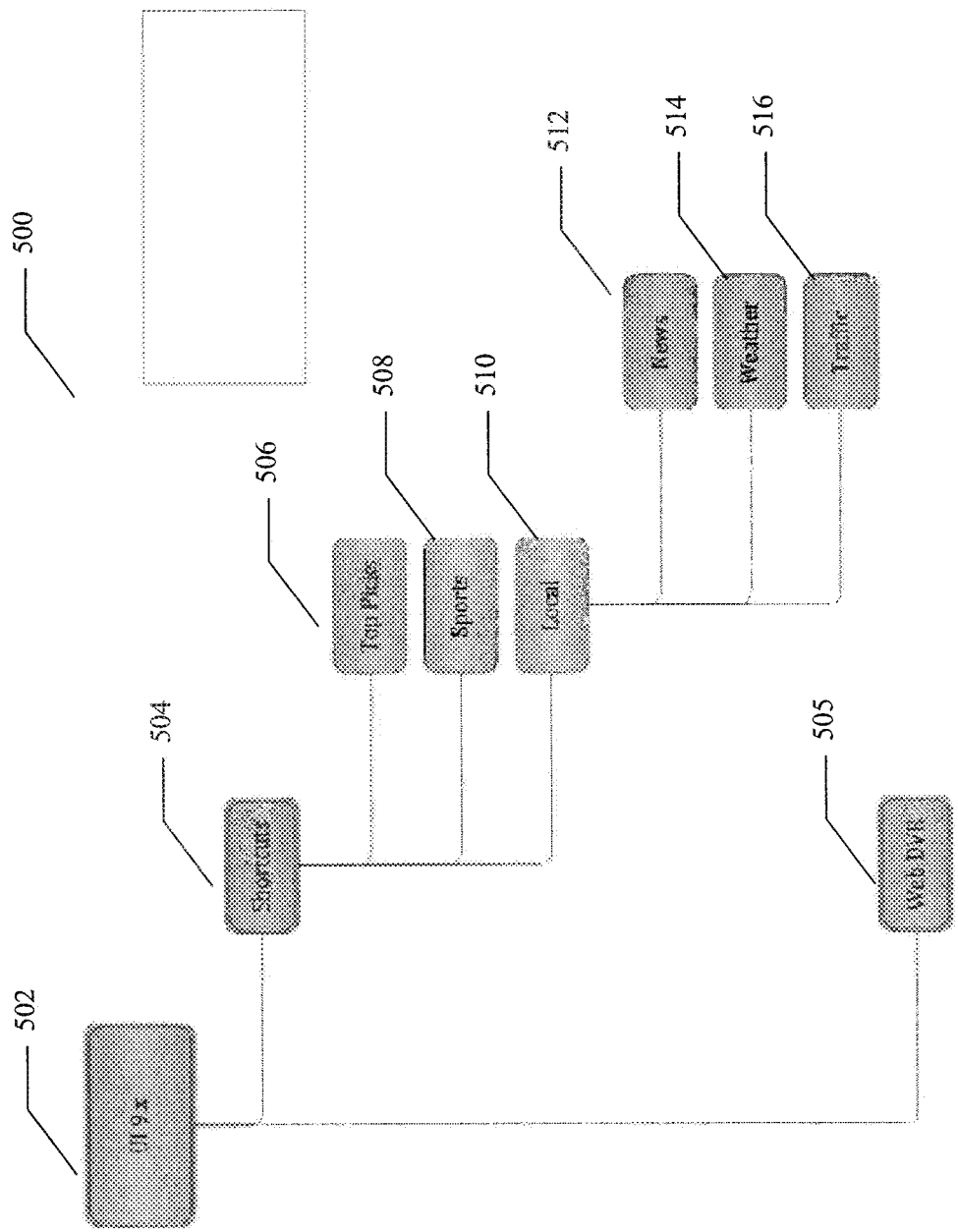
FIG. 5a is a diagram illustrating a dependency tree for describing feature set dependency according to an embodiment of the present invention.

FIG. 5a is a diagram illustrating a dependency tree 500 for describing feature set dependency according to an embodiment of the present invention. As shown in FIG. 5a, UI version 9.x 502 offers two features: Shortcuts 504 and Web DVR 505. Shortcuts feature 504 include 3 component features—component feature Top Picks 506, component feature Sports 508, and component feature Local 510. component feature Local 510 itself includes 3 component features: News 512, Traffic 514, and Weather 516. In the example illustrated in FIG. 5a, all features and component features are active, i.e., turned on, and available for subscriber use.

Figure 5B:
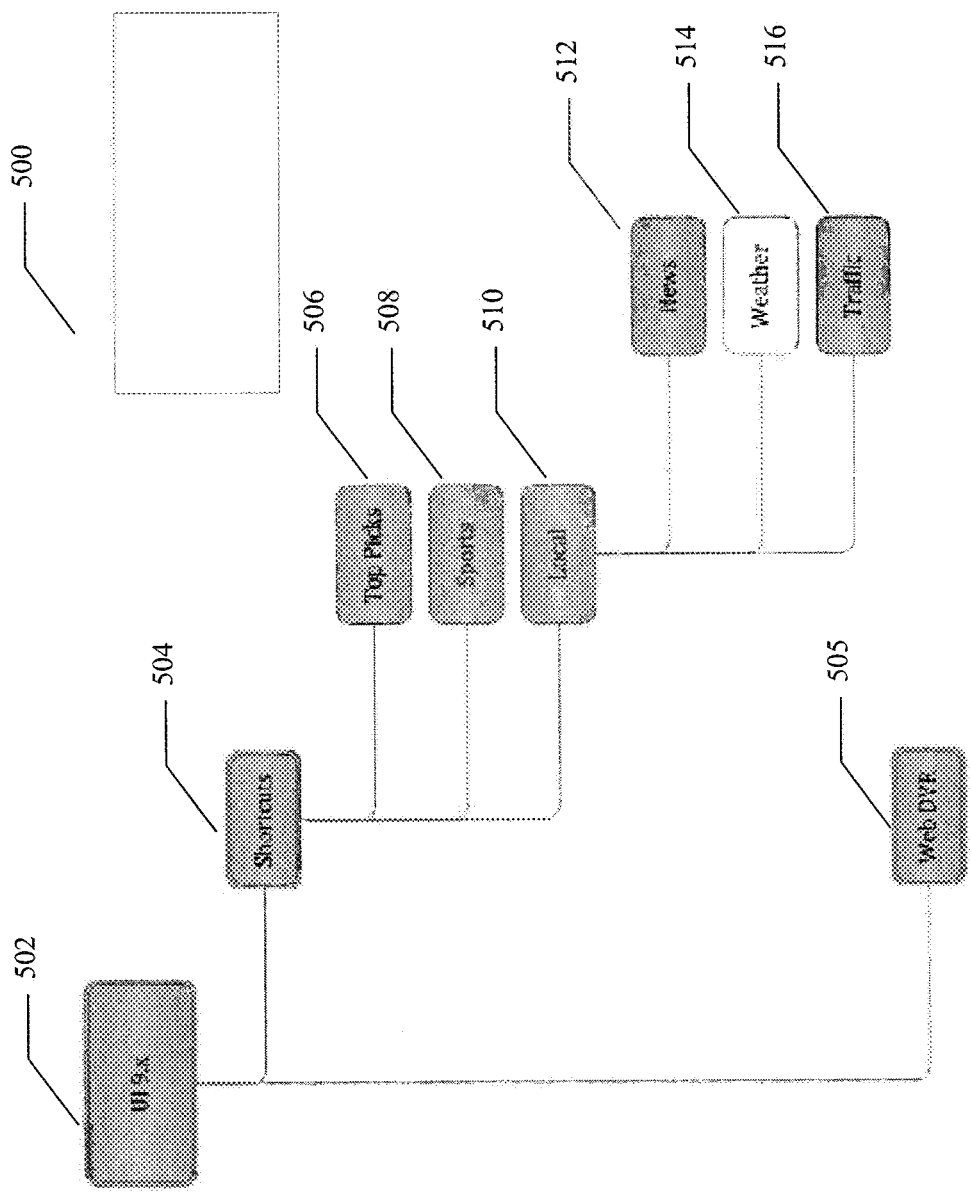
FIG. 5b is a diagram illustrating a dependency tree to show explicit deactivation of a feature according to an embodiment of the present invention.

Component features lower in the hierarchy can be deactivated explicitly and implicitly. FIG. 5b is a diagram illustrating dependency tree 500 to show explicit deactivation of a component feature according to an embodiment of the present invention. As shown in FIG. 5b Weather 514 is explicitly deactivated (illustrated by the different shading). As a result, subscribers cannot use the features of Weather 514.

Figure 5C:
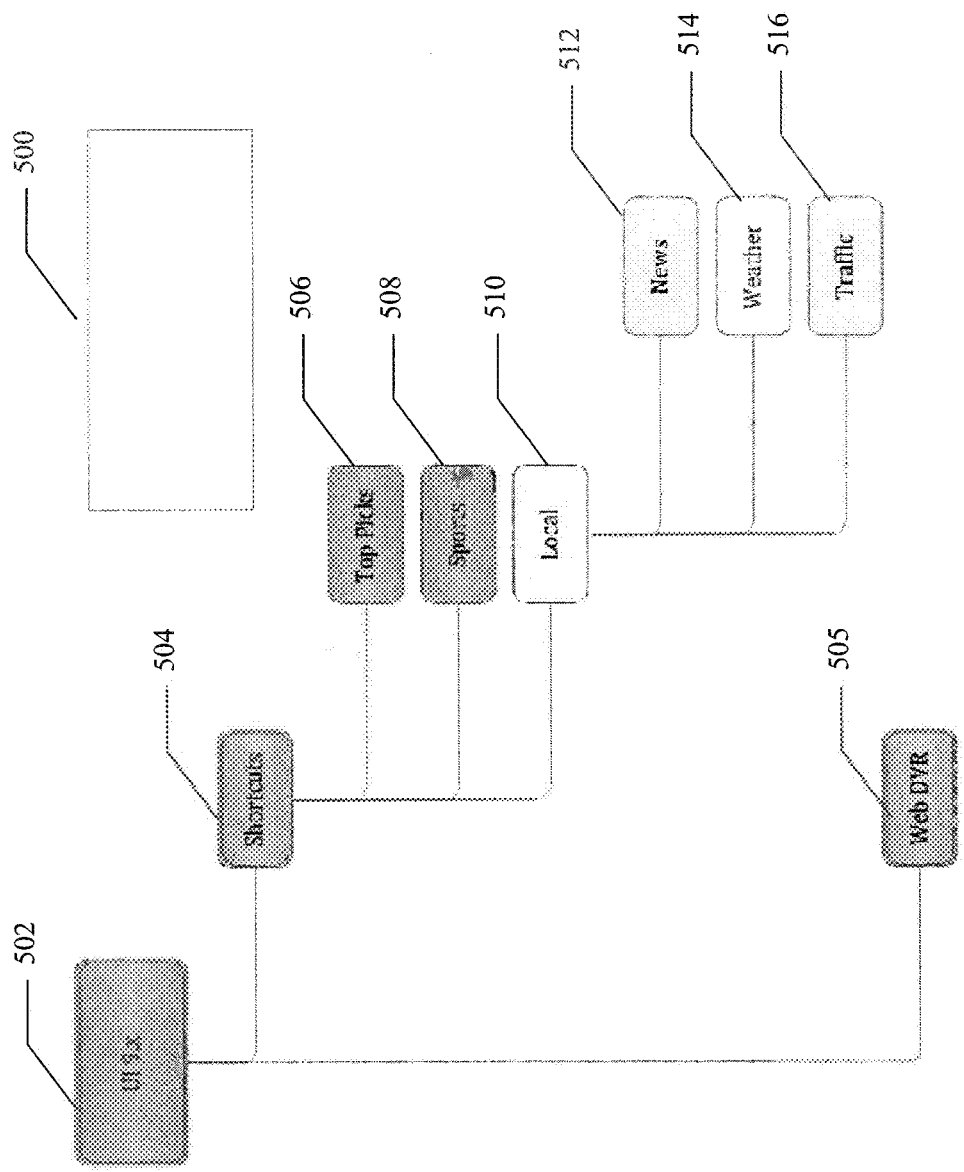
FIG. 5c is a diagram illustrating a dependency tree to show implicit deactivation of features by explicitly deactivating a service higher in the hierarchy.

FIG. 5c is a diagram illustrating dependency tee 500 to show implicit deactivation of component features by explicitly deactivating a feature or component feature higher in the hierarchy. For example, as shown in FIG. 5c, by deactivating component feature Local 510, its 3 included component features are also deactivated without having to explicitly deactivate them. That is, by explicitly deactivating component feature Local 510, component feature News 512, Weather 514, and Traffic 516 are implicitly deactivated.

In the embodiment illustrated in FIG. 5c if component feature Local 514 is reactivated, only component features News 512 and Traffic 516 are reactivated. This is due to the prior explicit deactivation of component feature Weather 514. In another embodiment, reactivation of a feature or component feature higher in the hierarchy reactivates all component features dependent on the reactivated feature or component feature notwithstanding the prior state of a particular component feature.

In an embodiment, the forgoing dependency tree structure is represented in memory as a data structure with each feature or component feature represented by a bit in the data structure indicating whether that feature or component feature is on or off (activated or deactivated). Each component feature dependent on a feature or component feature that is deactivated will inherit the deactivated state. When a feature or component feature is reactivated from a deactivated state, each component feature dependent on the reactivated feature or component feature will return to the on/off state it was in prior to the deactivation.

Which services are activated for a particular STB is determined by the deployment group to which the STB is assigned. Each STB obtains its deployment group either upon reboot or in a "hot" manner via messages sent from the head end. The messages can be initiated by the head end or sent in response to a query from STB 102.

Figure 6:
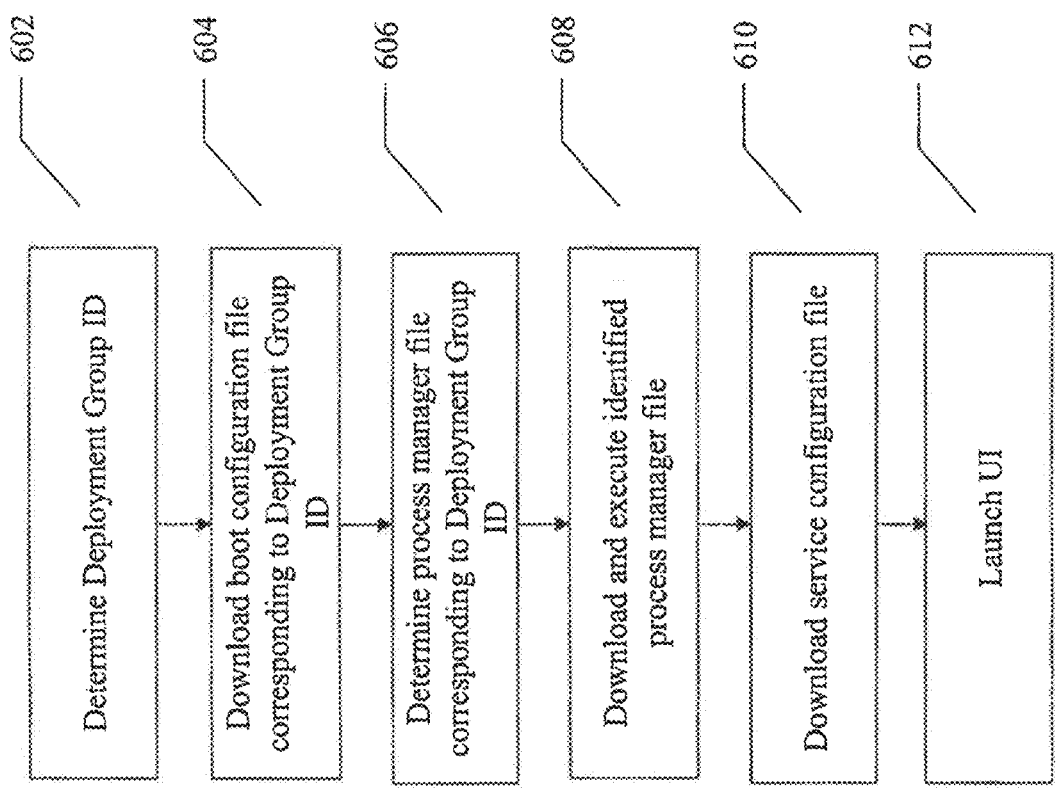
FIG. 6 is a flow chart for a method of obtaining software and/or data for an STB based on its deployment group ID according to an embodiment of the present invention.

FIG. 6 is a flow chart for a method of obtaining software and/or data for an STB, such as STB 102, based on its deployment group ID according to an embodiment of the present invention. In step 602, a boot loader executable file is downloaded to the STB for execution. For example, in an embodiment, the boot loader executable file is downloaded to the STB from broadcast file system (BFS) 107, CCCS 105 or ADS 106. The boot loader executable file is responsible for determining the group ID for an STB, and obtaining the appropriate software packages corresponding to that group ID.

In step 604, the boot loader executable file determines the STB's deployment group ID, that is, which deployment group the STB is assigned to. In one embodiment, the boot loader executable file reads the group ID from non-volatile memory, such as NVRAM 226 in FIG. 2. In an alternate embodiment, the deployment group ID is transmitted in a message sent from the head end. For example, the message can be sent from ADS 106 to the STB using the TCP/IP protocol. In another embodiment, the message can be encapsulated in an MPEG data frame and sent to the STB from BFS 107. In another embodiment, the message is sent from CCCS 105 using DOCSIS.

After determining deployment group ID, in step 606, the boot manager file downloads and parses a boot configuration file from the head end. In an embodiment, the boot configuration file is provided by BFS 107. Using the downloaded boot configuration file, the boot manager file determines the UI version and its download location corresponding to the STB's deployment group ID. Exemplary boot configuration files are described with respect to FIGS. 7a and 7b.

In step 606, the appropriate process manager file is identified based on the STB's deployment group ID. In step 608, the identified process manager file is downloaded and executed. Execution of the process manager file completes downloading of the remaining software, for example, UI or other application. When executed, the process manager file locates and downloads the appropriate software for the STB. The downloads can be from CCCS 105 using DOCSIS, from BFS 107 using software encapsulated in an MPEG video frame, and/or ADS 106 using TCP/IP.

To change the STB group deployment ID when the STB is already registered and active, the head end sends a message to the STB with the new group ID. For example, in an embodiment, the message is sent over communication link 113 using TCP/IP. In another embodiment, the message is encapsulated in an MPEG video frame and sent from BFS 107 over communication link 111. In an alternate embodiment, the message is sent from CCCS 105 over communication link 109 using DOCSIS. The STB receives the message and updates its non-volatile memory with the new Group ID. The STB then identifies and downloads the required software and/or data as described beginning in step 602. Alternatively, if the new deployment group ID is not stored to NVRAM 226, the STB identifies and downloads the required software and/or data beginning in step 604.

In step 610, a services configuration file is downloaded. The services configuration file identifies which features are available to the STB. For example, as described above with respect to FIGS. 5a-c, the available features are provided according to the deployment group ID assigned to the STB. In an embodiment, there is a services configuration file corresponding to each deployment group ID.

The services configuration file determines what features are loaded on the box and their on/off status for a particular deployment group ID. An exemplary services configuration file 800 is described with respect to FIG. 8

After the configuration is set in accordance with the services configuration file, the process manager file launches the UI in step 612.

FIG. 7a illustrates schematically an exemplary boot configuration file 702 according to an embodiment of the present invention. As shown in FIG. 7a, boot configuration file 702 includes 3 records, 704, 706, and 708. Each record has 3 fields: Group, UI Version, and Location. Embodiments may have more or fewer than 3 records, each having more or fewer than 3 fields, depending on configuration requirements. Each record corresponds to a different deployment group. For example, record 704 corresponds to deployment groups 0. Record 706 corresponds to deployment group 1. Record 708 corresponds to deployment group 2. Deployment group 0 is associated with UI version 9.0, and the management file to complete the configuration process for deployment group 0 is located at "bfs1://xxx/cv_mgr.ptv." Deployment group 1 is associated with UI version R12, and the management file to complete the configuration process for deployment group 1 is located at "bfs2://yyy/cv_mgr.ptv." Deployment group 2 is associated with UI version 9.5, and the management file to complete the configuration process for deployment group 2 is located at "bfs1://zzz/cv_mgr.ptv."

FIG. 7b illustrates exemplary boot configuration file 710 called "versions.cfg" according to another embodiment of the present invention. As shown in FIG. 7b, boot configuration file 702 includes 7 configuration records: record 712, record 714, record 716, record 718, record 720, record 722, and record 724. Record 712 is the name of the boot configuration file, "versions.cfg." Record 714 of the boot configuration file is a header record that describes the fields of the ensuing records. As shown in FIG. 7b, configuration records in exemplary boot configuration file 704 have 9 fields: dncsip, uiver, fdate, ftime, drange, dgroup, forcedg, execpath, and params. In the exemplary embodiment, these fields are defined as shown in Table 1:

TABLE 1

Exemplary Fields of Boot Configuration File 710

| Field Name | Definition |
|---|---|
| Dncsip | IP address of DNCS |
| Uiver | UI version |
| Fdate | Start date of an upgrade |
| Ftime | Start time of an upgrade |
| Frange | Minutes of upgrade |
| Dgroup | Deployment group ID |
| Forcedg | Forced default deployment group. If set to 1, it makes the current record the default deployment group. If set to 0, the STB will overwrite the non-volatile memory (NVRAM) of the group with the new default group. |
| Execpath | Boot loader executable path |
| Params | Boot loader executable parameters |

For example, record 722 indicates the IP address of the dncs is 10.251.209.65. Further, record 722 is associated with UI version 0.86.201. Record 722 is associated with activity scheduled to begin on Jun. 22, 2009 at 14:30 and last for 10 minutes. The activity corresponding to record 722 will affect only those STBs assigned to deployment group 4. STBs assigned to the affected group will have their NVRAM 226 updated to deployment group 0. Parameters to be used by the boot loader executable file are located at "bfs:///UI_APP-00B/cv_mgr_ebif.cfg."

In an embodiment, header record 714 of boot configuration file 710 is optional. Further, more or fewer records and/or more or fewer header fields may be implemented as required for a particular embodiment.

FIG. 8 illustrates an exemplary services configuration file 800 according to an embodiment. As shown in FIG. 8, services configuration file 800 includes 21 records, record 802 through record 842. Record 802 of services configuration file 800 is a header record that describes the fields of the ensuing records. As shown in FIG. 8, configuration records in services configuration file 800 have 8 fields: featuredesc, dgroup, deps, startpw, endpw, uiversion, params, precondition. In the exemplary embodiment, these fields are defined as shown in Table 2:

TABLE 2

Exemplary Fields of Services Configuration File 800

| Field Name | Definition |
|---|---|
| Featuredesc | Feature name |
| Dgroup | Group identifier |
| Deps | List of feature dependencies |
| Startpw | Start time of group |
| Endpw | End time of group |
| Uiversion | List of UI versions on which this group is available |
| Params | Parameters |
| Precondition | Preconditions for this feature. |

No value provided in a field of services configuration file 800 indicates that feature does not use the field.

The precondition is a condition on which the particular feature record is implemented. Precondition predicates allow setting up of flexible rules that provide additional conditions to determine feature should be enabled or disabled. The predicate expression can evaluate only to true or false. The use of predicates is option, and leaving the predicate column empty disables them, and defaults the evaluation to true. Predicates allow enabling disabling features based on the STB environment. Operators used to form the predicates are provide in Table 3 below. Pre-defined variables for use in the evaluations according to an embodiment are provided in Table 4 below. Other operators and/or pre-defined variables may be used in other embodiments depending on implementation.

TABLE 3

| Operators | |
|---|---|
| Operator | Description |
| == | Equal |
| != | Not Equal |
| >= | Greater Than or Equal |
| <= | Less Than or Equal |
| > | Great Than |
| < | Less Than |
| ~= | Pattern Matching Operator |
| + | Addition |
| - | Subtraction |
| * | Multiplication |
| / | Division |
| % | Modulo |
| << | Bitwise Shift Left |
| >> | Bitwise Shift Right |
| & | Bitwise And |
| \| | Bitwise Or |
| ^ | Bitwise Xor |
| . | String concatenation |
| # | String-to-Integer conversion |

TABLE 4

| Pre-defined Variables | | |
|---|---|---|
| Name | Description | Examples |
| Model | STB Model | 4200HD, 8300 |
| Agent | CAS Agent | 0—NDS, 1—PowerKey, <0—unknown |
| Homeid | Home ID | 13245 |
| Zipcode | Zip Code | 10516 |
| Commun | Communications Mode (Docsis/Davic) | 0—Davic, 1—Docsis |

For example, record 814 corresponds to a feature set called "test3_1_0." Feature set "test3_1_0 is associated with deployment group ID 236 and has 2 dependent features sets, feature set "test9_1_0" and feature set "test10_1_0." Thus, feature sets "test9_1_0" and "test10_1_0" are lower that feature set "test3_1_0" in the hierarchy or dependency trees described with respect to FIGS. 5a-c. Feature set "test3_1_0" has a start time of 1243915200 and end time of 1306987200 and will use UI version 0.86.10. Feature set "test3_1_0" has no parameters or preconditions.

In an embodiment, header record 802 or services configuration file 800 is optional. Further, more or fewer records and/or more or fewer header fields may be implemented as required for a particular embodiment.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

What is claimed is:

1. A method for updating, selecting, and controlling applications in a set top box in a cable system, comprising:
    determining a deployment group identifier of the set top box;
    downloading a boot configuration file corresponding to the deployment group identifier;
    identifying a process manager file using data in the boot configuration file;
    downloading and executing the identified process manager file that identifies the applications configured to execute on the set top box;
    downloading a services configuration file corresponding to the deployment group identifier, wherein the services configuration file identifies features available on the set top box; and
    launching a user interface for the identified applications in accordance with the features available in the downloaded services configuration file.

2. The method of claim 1, wherein the boot configuration file contains data identifying a user interface version, and further comprising downloading the boot configuration file corresponding to the deployment group identifier and the user interface version.

3. The method of claim 1, wherein the boot configuration file contains data identifying a location of the boot manager file.

4. The method of claim 1, wherein the services configuration file identifies features associated with the deployment group identifier.

5. The method of claim 1, wherein the services configuration file identifies feature dependencies associated with the deployment group identifier.

6. The method of claim 1, wherein downloading is performed using one or more of DOCSIS, TCP/IP, or MPEG video frames.

7. The method of claim 1, further comprising:
    updating the deployment group identifier, wherein the updated deployment group identifier enables the set top box to launch a user interface for accessing a different set of applications configured to execute on the set top box.

8. A system for updating, selecting, and controlling applications in a cable system, comprising:
    a set top box configured to:
        determine a deployment group identifier of the set top box;
        download a boot configuration file corresponding to the deployment group identifier;
        identify a process manager file using data in the boot configuration file;
        download and execute the identified process manager file that identifies the applications configured to execute on the set top box;
        download a services configuration file corresponding to the deployment group identifier, wherein the services configuration file identifies features available on the set top box; and
        launch a user interface for the identified applications in accordance with the features available in the downloaded services configuration file.

9. The system of claim 8, wherein the boot configuration file contains data identifying a user interface version; and
    the set top box is further configured to download the boot configuration file corresponding to the deployment group identifier and the user interface version.

10. The system of claim 8, wherein the boot configuration file contains data identifying a location of the boot manager file.

11. The system of claim 8, wherein the services configuration file identifies features associated with the deployment group identifier.

12. The system of claim 8, wherein the services configuration file identifies feature dependencies associated with the deployment group identifier.

13. The system of claim 8, wherein downloading is performed using one or more of DOCSIS, TCP/IP, or MPEG video frames.

14. The system of claim 8, wherein the set top box is further configured to update the deployment group identifier, wherein the updated deployment group identifier enables the set top box to launch a user interface for accessing a different set of applications configured to execute on the set top box.

15. A non-transitory computer-readable medium, having instructions stored thereon, wherein the instructions cause a computing device to perform operations for updating, selecting, and controlling applications in a set top box in a cable system, the operations comprising:
    determining a deployment group identifier of the set top box;
    downloading a boot configuration file corresponding to the deployment group identifier;
    identifying a process manager file using data in the boot configuration file;
    downloading and executing the identified process manager file that identifies the applications configured to execute on the set top box;
    downloading a services configuration file corresponding to the deployment group identifier, wherein the services configuration file identifies features available on the set top box; and
    launching a user interface for the identified applications in accordance with the downloaded services configuration file.

16. The computer-readable medium of claim 15, wherein the boot configuration file contains data identifying a user interface version, and the instructions further comprise operations comprising:
    downloading the boot configuration file corresponding to the deployment group identifier and the user interface version.

17. The computer-readable medium of claim 15, wherein the boot configuration file contains data identifying a location of the boot manager file.

18. The computer-readable medium of claim 15, wherein the services configuration file identifies features associated with the deployment group identifier.

19. The computer-readable medium of claim 15, wherein the services configuration file identifies feature dependencies associated with the deployment group identifier.

20. The computer-readable medium of claim 15, wherein downloading is performed using one or more of DOCSIS, TCP/IP, or MPEG video frames.

* * * * *